United States Patent
Tyler et al.

(10) Patent No.: US 10,651,432 B2
(45) Date of Patent: May 12, 2020

(54) SYSTEMS AND METHODS FOR A REINFORCEMENT COLUMN WITHIN A MODULE BODY

(71) Applicant: CPS Technology Holdings LLC, New York, NY (US)

(72) Inventors: Matthew R. Tyler, Brown Deer, WI (US); Richard M. DeKeuster, Racine, WI (US); Dale B. Trester, Milwaukee, WI (US); Christopher M. Bonin, South Milwaukee, WI (US)

(73) Assignee: CPS Technology Holdings LLC, New York, NY (US)

( * ) Notice: Subject to any disclaimer, the term of this patent is extended or adjusted under 35 U.S.C. 154(b) by 798 days.

(21) Appl. No.: 14/815,372

(22) Filed: Jul. 31, 2015

(65) Prior Publication Data

US 2016/0301039 A1    Oct. 13, 2016

Related U.S. Application Data

(60) Provisional application No. 62/146,868, filed on Apr. 13, 2015.

(51) Int. Cl.
| | |
|---|---|
| *H01M 2/02* | (2006.01) |
| *H01M 2/10* | (2006.01) |
| *H01M 10/0525* | (2010.01) |
| *H01M 10/058* | (2010.01) |
| *H01M 2/14* | (2006.01) |

(52) U.S. Cl.
CPC ....... *H01M 2/0242* (2013.01); *H01M 2/1077* (2013.01); *H01M 10/058* (2013.01); *H01M 10/0525* (2013.01); *H01M 2/1094* (2013.01); *H01M 2/14* (2013.01); *H01M 2220/20* (2013.01)

(58) Field of Classification Search
CPC .... H01M 2/14; H01M 2/1077; H01M 2/1094; H01M 2/0242
See application file for complete search history.

(56) References Cited

U.S. PATENT DOCUMENTS

| | | | |
|---|---|---|---|
| 5,763,118 A | 6/1998 | Stafford et al. | |
| 7,955,730 B2 | 6/2011 | Kim et al. | |
| 8,785,027 B2 | 7/2014 | Soong et al. | |
| 2002/0015880 A1 | 2/2002 | Heimer | |
| 2006/0050468 A1* | 3/2006 | Inoue .............. | H01G 2/04 |
| | | | 361/328 |
| 2008/0050645 A1 | 2/2008 | Kai et al. | |
| 2012/0208050 A1 | 8/2012 | Chen | |
| 2013/0207459 A1 | 8/2013 | Schroder et al. | |
| 2013/0273398 A1 | 10/2013 | Hoshi et al. | |

FOREIGN PATENT DOCUMENTS

| | | |
|---|---|---|
| CN | 100550236 C | 10/2009 |
| CN | 201796972 U | 4/2011 |
| CN | 103378326 A | 10/2013 |
| CN | 203312390 | 11/2013 |
| CN | 104137294 A | 11/2014 |
| JP | 2013101829 | 5/2013 |
| JP | 2014099312 | 5/2014 |
| WO | 2010127542 | 11/2010 |

OTHER PUBLICATIONS

PCT/US2016/017919 International Search Report and Written Opinion dated May 23, 2016.

* cited by examiner

*Primary Examiner* — Ladan Mohaddes
(74) *Attorney, Agent, or Firm* — Boardman & Clark LLP (57) ABSTRACT

The present disclosure relates to a battery module having a housing with a first cover and a second cover. The battery module includes a plurality of lithium-ion (Li-ion) electrochemical cells disposed in the housing adjacent to the second cover. The battery module also includes a reinforcement column disposed within the housing that extends along a direction from the second cover to the first cover. The reinforcement column is positioned against the first cover and is coupled to a feature between the first and second covers, and the reinforcement column is configured to enhance a load bearing capacity of the battery module.

14 Claims, 6 Drawing Sheets

SYSTEMS AND METHODS FOR A REINFORCEMENT COLUMN WITHIN A MODULE BODY

CROSS REFERENCE TO RELATED APPLICATIONS

This application claims priority to and the benefit of U.S. Provisional Application Ser. No. 62/146,868, entitled "HOUSING AND COVER SUPPORT COLUMNS FOR WITHSTANDING CRUSH AND IMPACT LOADING", filed Apr. 13, 2015, which is hereby incorporated by reference.

BACKGROUND

The present disclosure relates generally to the field of batteries and battery modules. More specifically, the present disclosure relates to a support component that provides structural reinforcement for the housing of a battery module.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may be subject to large loads or high impact situations. Various components disposed within the housing of the battery module, such as electrochemical cells and other circuitry, may be damaged by these forces. Accordingly, it is now recognized that it may be desirable to provide additional reinforcement to the structure of the battery module to protect components disposed within the battery module from impact.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below. The present disclosure relates to batteries and battery modules. More specifically, the present disclosure relates to lithium ion battery cells that may be used in vehicular contexts (e.g., xEVs) as well as other energy storage/expending applications (e.g., energy storage for an electrical grid).

The present disclosure relates to a battery module having a housing with a first cover and a second cover. The battery module includes a plurality of lithium-ion (Li-ion) electrochemical cells disposed in the housing adjacent to the second cover. The battery module also includes a reinforcement column disposed within the housing that extends along a direction from the second cover to the first cover. The reinforcement column is positioned against the first cover and is coupled to a feature between the first and second covers, and the reinforcement column is configured to enhance a load bearing capacity of the battery module.

The present disclosure also relates to a battery module having a housing with a first cover, a cell receptacle region, an electronics compartment, and an internal partition separating the cell receptacle and the electronics compartment. The battery module includes a plurality of electrochemical cells disposed within the cell receptacle region. The battery module also includes a reinforcement column with a base and an apex disposed within the electronics compartment. The reinforcement column extends in a first direction from the internal partition toward the first cover, and the reinforcement column is configured to enhance a load bearing capacity of the battery module.

The present disclosure also relates to a method of manufacturing a battery module. The method includes disposing a plurality of prismatic lithium-ion (Li-ion) electrochemical cells within a cell receptacle, where the cell receptacle is disposed within a housing of the battery module. The method also includes disposing electrical circuitry within an electronics compartment. The electronics compartment is disposed within the housing of the battery module and is separated from the cell receptacle by an internal partition. The method also includes coupling a first cover to the housing, where coupling the first cover to the housing includes deflecting the first cover into the housing such that the first cover abuts a reinforcement column of the housing. The reinforcement column extends from the internal partition to the first cover within the electronics compartment.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, a battery module may include a housing having an integrated structural reinforcement component that provides additional support for withstanding various forces placed on the module during operation. In particular, the structural reinforcement component may enhance the load bearing capacity of the battery module to improve the crush and impact loading strength of the battery module. In certain embodiments, the housing of the battery module may include a cell receptacle region, an electronics compartment, and an internal partition that separates the cell receptacle region from the electronics compartment. In certain embodiments, the structural reinforcement component may be disposed within the electronics compartment and may extend the length of the electronics compartment. For example, the structural reinforcement component may include a column that extends from the internal partition within the housing to a front cover of the battery module. In certain embodiments, the front cover may include a receptacle region that contacts the structural reinforcement component without coupling with the structural reinforcement component. Furthermore, in certain embodiments, the front cover may include ribbing that distributes a portion of the load from the structural reinforcement component through the front cover to further enhance the load bearing capacity of the battery module.

In certain embodiments, the structural reinforcement component may be a hollow or a solid column that extends from the internal partition of the battery module to the front cover of the battery module. In some embodiments, the cross sectional geometry of the structural reinforcement component may be varied as it extends from the internal partition to the front cover, while in other embodiments, the cross sectional geometry of the structural reinforcement component may be uniform as it extends from the internal partition to the front cover. As an example, the structural reinforcement column may be a frusto-conical shape, a polygon, a conical shape, a corrugated shape, or a tubular shape. Further, in certain embodiments, the structural reinforcement component may include any type of geometrical base (e.g., square, rectangular, circular, oval, etc.). While the disclosed embodiments describe one structural reinforcement component disposed within the housing, it should be noted that any number (e.g., 2, 3, 4, 5, or more) of structural reinforcement components may be disposed within the housing, as permitted by space and other design considerations. Further, in certain embodiments, one or more structural reinforcement components may be arranged in one or more concentric circles within the housing. These and other features will be described in detail below with reference to the figures.

Figure 1:
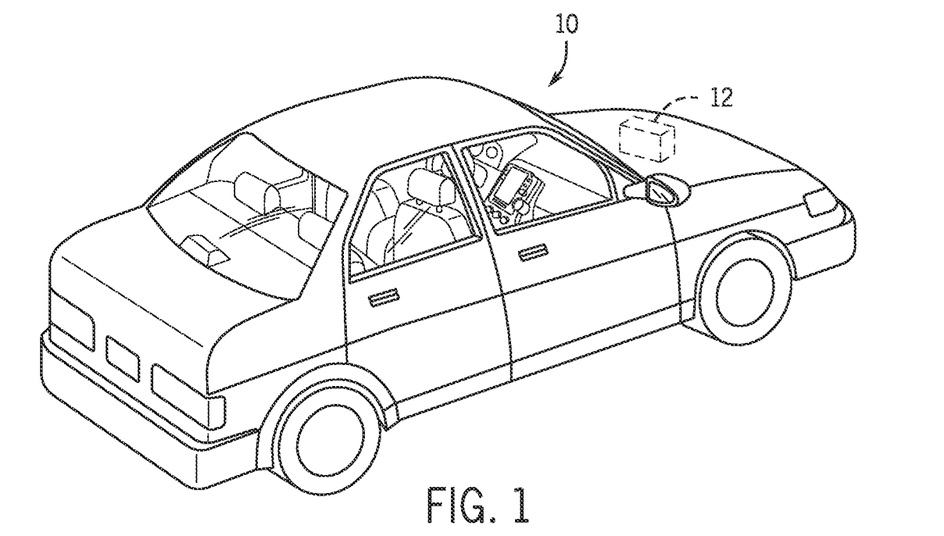
FIG. 1 is a perspective view of a vehicle having a battery system configured in accordance with present embodiments to provide power for various components of the vehicle, in accordance with an aspect of the present disclosure.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning the battery system 12 under the hood of the vehicle 10 may enable an air duct to channel airflow over the battery system 12 and cool the battery system 12.

Figure 2:
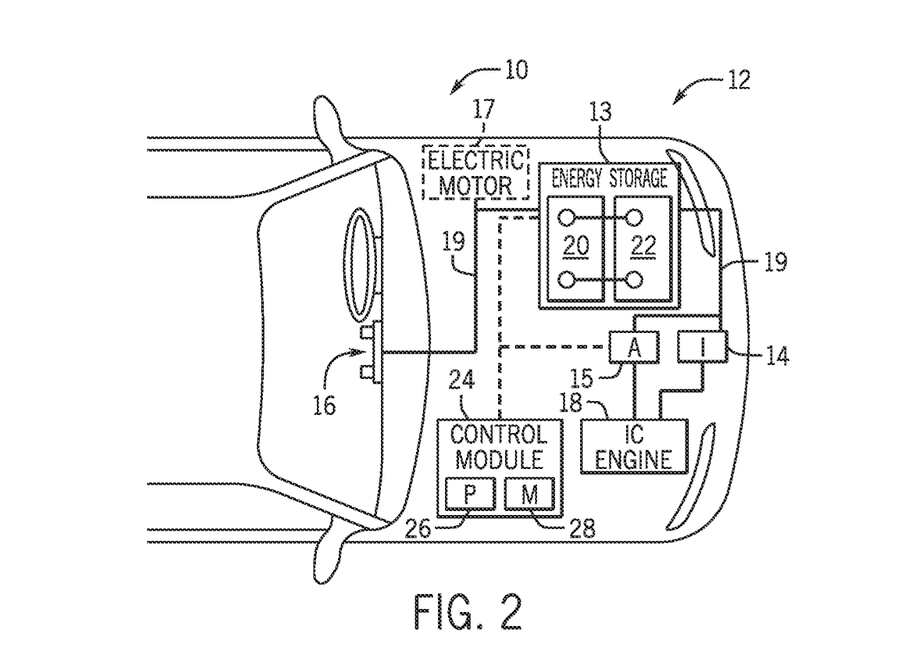
FIG. 2 is cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running more specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
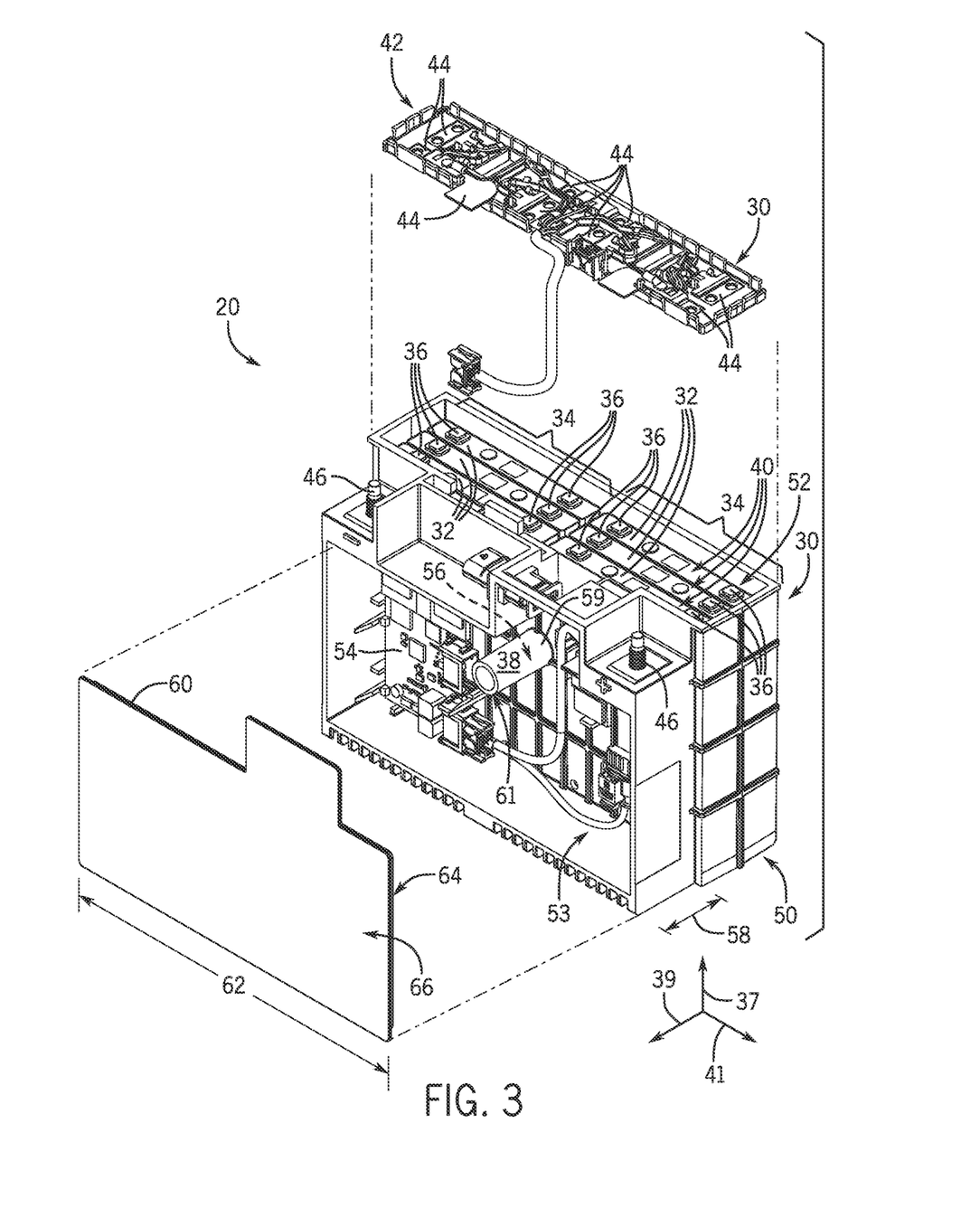
FIG. 3 is an exploded view of an embodiment of a battery module for use in the vehicle of FIG. 2, in accordance with an aspect of the present disclosure.

An overhead exploded perspective view of an embodiment of the battery module 20 is shown in FIG. 3. In the illustrated embodiment, the battery module 20 (e.g., lithium ion (Li-ion) battery module) includes a housing 30 and electrochemical cells 32 disposed inside the housing 30. In accordance with present embodiments, the battery module 20 includes a structural reinforcement component 38 disposed within the housing 30 of the battery module 20 to enhance the load bearing capacity of the battery module 20, as further described in detail below.

In the illustrated embodiment, six prismatic Li-ion electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 include terminals 36 extending upwardly (e.g., along a vertical axis 37 which is perpendicular to a lateral axis 41) from terminal ends 40 of the electrochemical cells 32. A bus bar carrier 42 may retain bus bars 44 disposed thereon, and the bus bars 44 may be configured to interface with the terminals 36 of the electrochemical cells 32. For example, the bus bars 44 may interface with the terminals 36 to electrically couple adjacent electrochemical cells 32 together. Depending on the embodiment, the bus bars 44 may couple the electrochemical cells 32 in series, in parallel, or some of the electrochemical cells 32 in series and some of the electrochemical cells 32 in parallel. Further, certain of the bus bars 44 may be configured to electrically couple the electrically interconnected group of electrochemical cells 32 with major terminals 46 of the battery module 20, where the major terminals 46 are configured to be coupled to a load (e.g., component(s) of the vehicle 10) to power the load. In certain embodiments, the terminal ends 40 of the electrochemical cells 32 may be aligned in a single plane. Further, the bottom ends 50 of the electrochemical cells 32 (e.g., opposite to the terminal ends 40) may not be aligned.

The electrochemical cells 32 may be disposed within a cell receptacle region 52 of the housing 30 that is separate from an electronics compartment 53 of the housing 30. Specifically, in certain embodiments, an internal partition 54 may be disposed within the housing 30 to separate the cell receptacle region 52 from the electronics compartment 53. For example, the internal partition 54 may be adjacent to the two stacks 34 of electrochemical cells 32, and may separate the electrochemical cells 32 from the electronics (e.g., including a control module, a relay, and so forth) disposed within the housing 30.

In certain embodiments, the structural reinforcement component 38 may extend a length 58 of the electronics compartment 53 of the housing 30 from the internal partition 54 to a front cover 60. In other words, the structural reinforcement component 38 may extend along a longitudinal axis 39 (depending on orientation) the length 58 of the electronics compartment 53. In certain embodiments, a base 59 of the structural reinforcement component 38 may be integrally formed (e.g., molded, coupled, welded, or otherwise fixedly coupled) with the internal partition 54. In addition, as further described with respect to FIG. 6, the front cover 60 may include a receptacle region 63 (shown in FIG. 6) disposed on an inner surface 64 opposite an outer surface 66. The receptacle region 63 may contact an apex 61 (e.g., free end) of the structural reinforcement component 38. Indeed, features of the receptacle region 63 may distribute the forces to provide additional structural support and load bearing capacity to the battery module 20. In certain embodiments, the receptacle region 63 may include features that receive and secure the structural reinforcement component 38 via various attachment features, thereby removably coupling the structural reinforcement component 38 to the front cover 60. In this manner, the structural reinforcement component 38 may be secured within the housing 30 of the battery module 20 while extending the length 58 of the electronics compartment 53.

In certain embodiments, the structural reinforcement component 38 may be disposed at approximately a center region 56 of the electronics compartment 53. Specifically, the center region 56 may be a volume or space at approximately the midpoint of a width 62 of the battery module 20 and extending the length 58 of the electronics compartment 53. Indeed, disposing the structural reinforcement component 38 at approximately the center region 56 of the electronics compartment 53 may help to receive and evenly distribute certain loads applied to the battery module 20. However, it should be noted that in other embodiments, one or more other structural reinforcement components 38 may be disposed at other locations throughout the electronics compartment 53 and the housing 30. Indeed, the number, the position, and the location of the one or more structural reinforcement components 38 may be arranged based on the desired amount or type of load bearing capacity. In certain embodiments, the structural reinforcement component 38 may be configured to carry loads between approximately 10 kilonewtons and 30 kilonewtons, between approximately 15 kilonewtons and 20 kilonewtons, or between approximately 16 kilonewtons and 18 kilonewtons. In certain embodiments, each of the one or more structural reinforcement components 38 may be designed and arranged within the housing 30 of the battery module 20 to carry loads of approximately 15 kilonewtons, 20 kilonewtons, 30 kilonewtons, 50 kilonewtons, or more than 50 kilonewtons.

Figure 4:
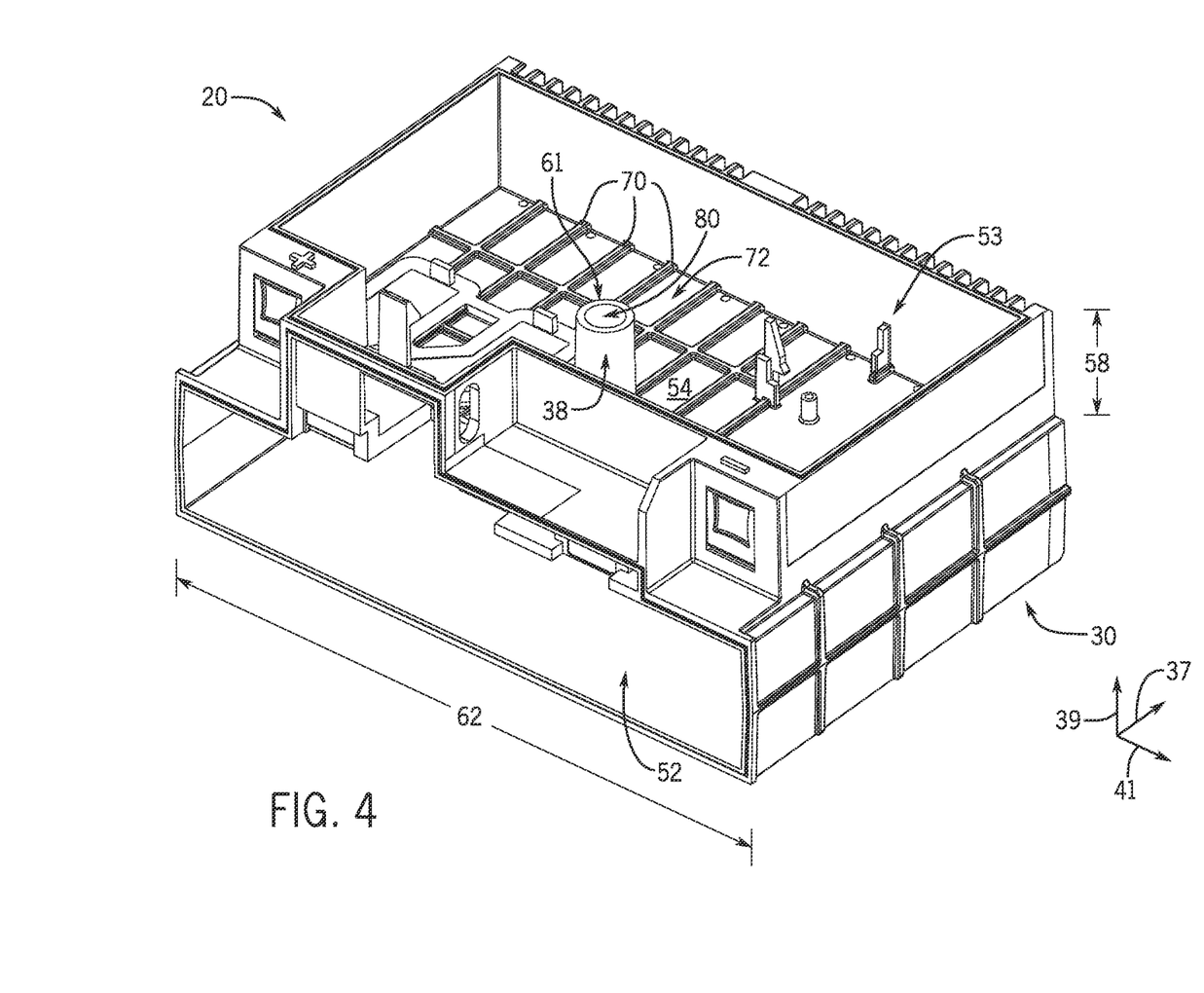
FIG. 4 is a perspective view of the housing of the battery module of FIG. 3, in accordance with an aspect of the present disclosure.

FIG. 4 is a perspective view of an embodiment of the housing 30 of the battery module 20 of FIG. 3, in accordance with an aspect of the present disclosure. In FIG. 4, the housing 30 is oriented such that the structural reinforcement component 38 is extending vertically upward from the internal partition 54. In particular, the illustrated embodiment is a view of the housing 30 with the structural reinforcement component 38 extending the length 58 of the electronics compartment 53 from the internal partition 54 to the front cover 60. Certain embodiments of the housing 30, as shown, may include additional features that work in conjunction with the structural reinforcement component 38 to enhance the load bearing capabilities of the module 20. In the illustrated embodiment, one or more ribs 70 are disposed on a first surface 72 of the internal partition 54. As illustrated, the ribs 70 may be raised (e.g., protrusions) from the first surface 72 of the internal partition 54, and may be configured to evenly distribute the load from the structural reinforcement component 38 through the internal partition 54. In certain embodiments, the ribs 70 may work in combination with other features disposed on the front cover 60 (see FIG. 6), such as additional ribs and/or other force distribution features. Such embodiments are described in further detail below with respect to FIG. 6.

In certain embodiments, the structural reinforcement component 38 may include, in a general sense, any geometry that provides enhanced load bearing for the module 20. For example, the structural reinforcement component 38 may have a frusto-conical, polygon, conical, corrugated, or tubular shape. In the illustrated embodiment of FIG. 4, the structural reinforcement component 38 is an annular column having the base 59 (shown in FIG. 5), the apex 61, and a hollow interior 80. As also illustrated, the structural reinforcement component 38 may be a column having a frusto-conical shape where the base 59 is larger than the apex 61. In such embodiments, the shape of the annular column may be achieved by inclining the edges between the base 59 to the apex 61 at a slight angle. However, it should be noted that in other embodiments, the base 59 and the apex 61 may be any geometrical shapes or combination of shapes, as further described with respect to FIGS. 7-9. Further, in certain embodiments, the structural reinforcement component 38 may not include the hollow interior 80 and may instead be solid.

Figure 5:
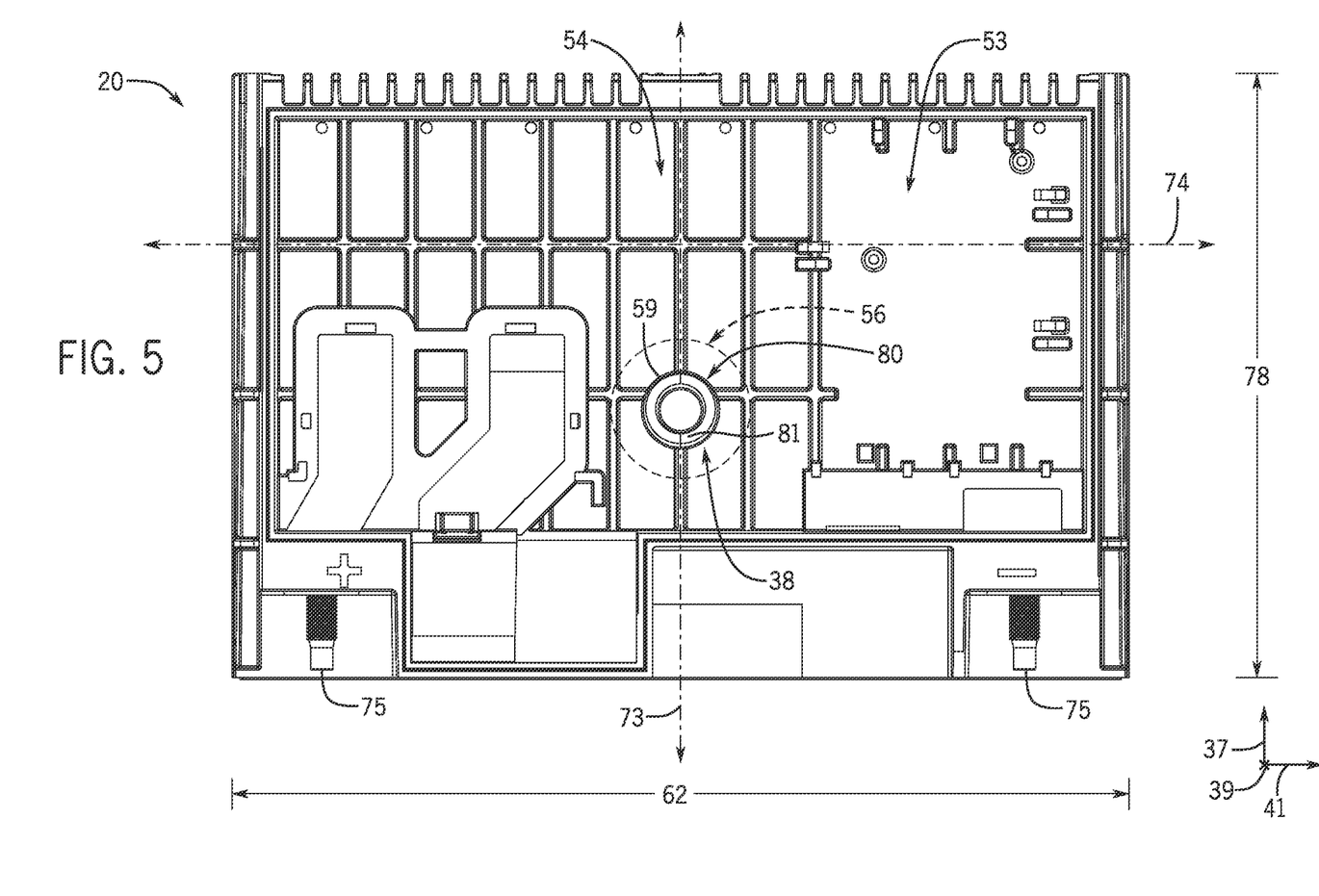
FIG. 5 is a plan view of the housing of FIG. 4, in accordance with an aspect of the present disclosure.

FIG. 5 is a side view of an embodiment of the housing 30 depicting the position of the structural reinforcement component 38 relative to the surface 54 and other module features. As noted above with respect to FIG. 3, in certain embodiments, the structural reinforcement component 38 may be disposed approximately at the center region 56 of the electronics compartment 53. For example, the center region 56 may be approximately the volume or space within the electronics compartment 53 where the midpoint across the width 62 intersects with a midpoint across a height 78 of the housing 30 of the battery module 30. Disposing the structural reinforcement component 38 at approximately the center region 56 of the electronics compartment 53 may help to efficiently distribute the force of an applied load. As a specific example of efficient utilization of the structural reinforcement component 38, the structural reinforcement component 38 may extend from the internal partition 54 between the major terminals 75 along the lateral axis 41 such that its distal end is free and cantilevered from the internal partition 54, the base 59 of the structural reinforcement component 38 may be integral with the internal partition 55 and molded with the ribs 70, and the structural reinforcement component 38 may extend a length of the electronics compartment 53 from the internal partition 55 to an opening for receiving the cover 60 with a varying or consistent outside diameter. However, other embodiments for the position and other design features for the structural reinforcement component 38 are contemplated to increase the load bearing capacity of the battery module 20, as further described below.

For example, it should be noted that the structural reinforcement component 38 does not need to be disposed exactly at the center region 56. Indeed, the structural reinforcement component 38 may be disposed at other locations within the housing 30, such as proximate to one of four corners, or closer to an edge of the housing 30. Further, one or more structural reinforcement components 38 may be disposed throughout the housing 30, such that each of the one or more structural reinforcement components 38 are configured to carry a portion of the load. In certain embodiments, one or more structural reinforcement components 38 may be disposed anywhere along a first plane 73 extending parallel to the vertical axis 37. In certain embodiments, the one or more structural reinforcement components 38 may be disposed anywhere along a second plane 74 extending parallel to the lateral axis 41. It should be noted that in certain embodiments, one or more structural reinforcement components 38 may be disposed along a plurality of planes parallel to the vertical axis 37 or lateral axis 41. In certain embodiments, one or more structural reinforcement components 38 may be disposed along a plane parallel to the vertical axis 37 and in between the major terminals 75. In certain embodiments, one or more structural reinforcement components 38 may be disposed in between electrical circuitry housed within the electronics compartment 53. Accordingly, the one or more structural reinforcement components 38 may be disposed anywhere within the electronics compartment 53 as long as the base 59 of the structural reinforcement component 38 is integral with the internal partition 54 (and/or interconnected with the ribs 70).

In certain embodiments, the structural reinforcement component 38 may have variable dimensions (e.g., height, width, diameter, etc.) based on the amount of load bearing capacity desired for the battery module 20. For example, as the height of and/or width of the structural reinforcement component 38 increases, the diameter may increase, thereby increasing the load capacity of the structural reinforcement component 38. Further, in certain embodiments, a width 81 of the walls of the structural reinforcement component 38 may be varied based on the desired load bearing capacity. For example, increasing the width 81 of the walls of the structural reinforcement component 38 may increase the load-bearing capacity of the structural reinforcement component 38. Further, in certain embodiments, the structural reinforcement component 38 may not be an annular column, but may include one or more components that are arranged in a broken ring to mimic the shape of an annular column. For example, in such embodiments, the structural reinforcement component 38 may be formed of a plurality of individual segments that are arranged in an annular column shape.

Figure 6:
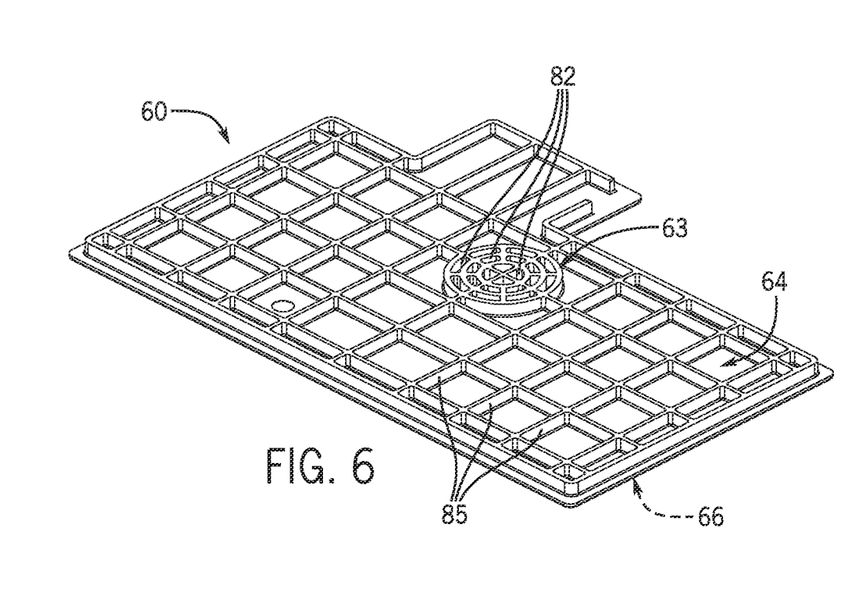
FIG. 6 is a perspective view of an embodiment of a front cover of the battery module of FIG. 3, in accordance with an aspect of the present disclosure.

As noted above, the structural reinforcement component 38 may extend across the length of the electronics compartment 53 from approximately the internal partition 54 to the front cover 60 (see FIG. 3). In particular, as shown in FIG. 6, the receptacle region 63 may be disposed on the inner surface 64 (e.g., facing toward the electronics compartment 53) of the front cover 60, which may be opposite the outer surface 66 (e.g., facing away from the electronics compartment 53). The receptacle region 63 may abut the structural reinforcement component 38 to the front cover 60. That is, in certain embodiments, while the structural reinforcement component 38 and the receptacle region 63 touch, they are not attached or otherwise coupled to one another. In other embodiments, the receptacle region 63 may include various attachment features 82 (e.g., clips, fasteners, prongs, grooves, mating projections, etc.) that removably receive and secure the structural reinforcement component 38 without permanently coupling the structural reinforcement component 38 to the front cover 60. Furthermore, the front cover 60 may include one or more ribs 85 disposed on the inner surface 64. In particular, the ribs 85 and the receptacle region 63 may be configured to distribute the load from the structural reinforcement component 38 through the front cover 60, as further described in detail below. In certain embodiments, the ribs 85 and the receptacle region 63 may be formed out of the same materials as the housing 30 and/or the same materials as the front cover 60.

In certain embodiments, the receptacle region 63 may be shaped to mimic the apex 61 of the structural reinforcement component 38. For example, in the illustrated embodiment, the receptacle region 63 may be circular to substantially contact the apex 61 of the annular column of FIGS. 3-5. However, it should be noted that the receptacle region 63 may be configured to complement the shape of the apex 61, in order to abut the apex 61 of the structural reinforcement component 38 in a manner that enables a desired amount of force distribution through the cover 60. As noted above, in certain embodiments, the receptacle region 63 may include one or more attachment features 82 (e.g., clips, fasteners, prongs, grooves, mating projections, etc.) that align with the apex 61 of the structural reinforcement component 38 to secure the apex 61 within the front cover 60. Accordingly, in such embodiments, the structural reinforcement component 38 may be secured with the front cover 60 without any permanent couplings, thereby allowing the structural reinforcement component 38 and the front cover 60 to be separated if desired. In certain embodiments, the receptacle region 63 may include one or more concentric circles connected by the ribs 85 that extend through the surface area of the front cover 60.

During an assembly or manufacturing process (e.g., injection molding or other suitable manufacturing techniques), the front cover 60 may be aligned with the battery module 20 such that the receptacle region 63 and the apex 61 of the structural reinforcement component 38 are in alignment. After proper alignment, the front cover 60 may be deflected inward into the housing until the receptacle region 63 and the structural reinforcement component 38 touch in a manner that enables distribution of a load, but are not otherwise attached or coupled. In certain embodiments, after proper alignment, the front cover 60 may be deflected inward into the housing until the receptacle region 63 and the structural reinforcement component 38 are removably attached via the attachment features 82. In embodiments where the structural reinforcement component 38 is secured or unsecured to the front cover 60, the ribs 85 and the structure of the receptacle region 63 on the front cover 60 may help prevent the structural reinforcement component 38 from driving through the front cover 60 and may help distribute the load through the front cover 60 when a load is applied to the battery module 20.

Figure 7:
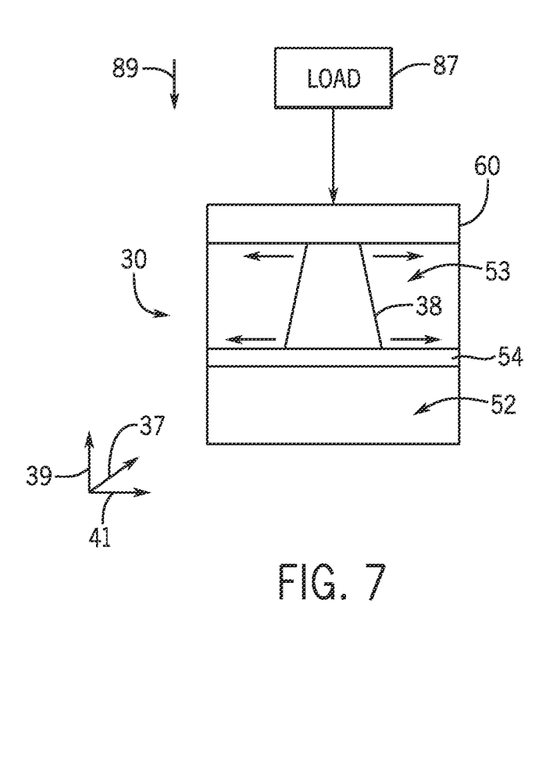
FIG. 7 is a schematic representation of an embodiment of the housing of FIG. 3 with a load applied to the front cover, in accordance with an aspect of the present disclosure.

For example, as shown in FIG. 7, a load 87 may be applied in a first direction 89 to the front cover 60 of the housing 30. Accordingly, as noted above, the structural reinforcement component 38 may help to support the load 87, thereby enhancing the load bearing capacity of the battery module 20. In certain embodiments, the ribs 85 disposed on the front cover 60 and the ribs 70 disposed on the internal partition 54 may help to distribute the load 87, thereby helping the structural reinforcement component 38 support the load 87. In this manner, the structural reinforcement component 38 may be configured to help prevent the load 87 from driving through the housing 30 when the load 87 is applied to the battery module 20.

Figure 8:
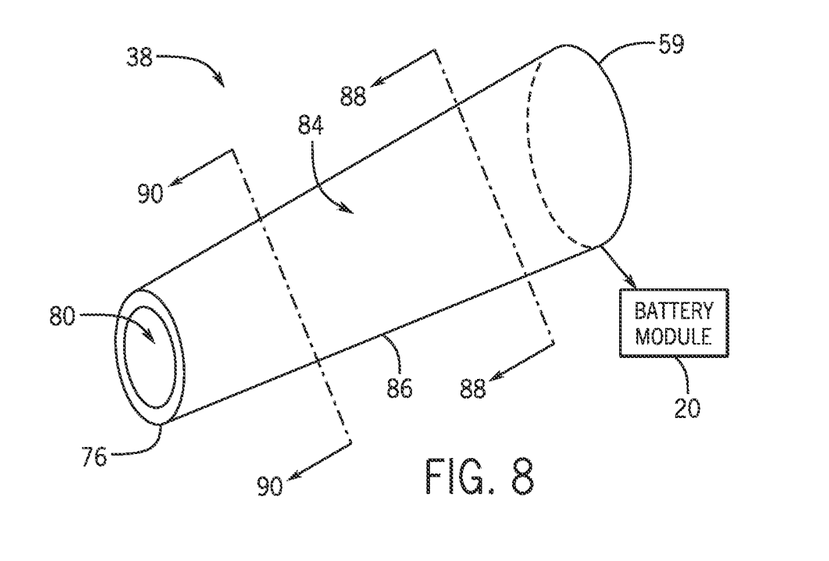
FIG. 8 is a schematic representation of an embodiment of a structural reinforcement component for use in the battery module of FIG. 3, in accordance with an aspect of the present disclosure.
Figure 9:
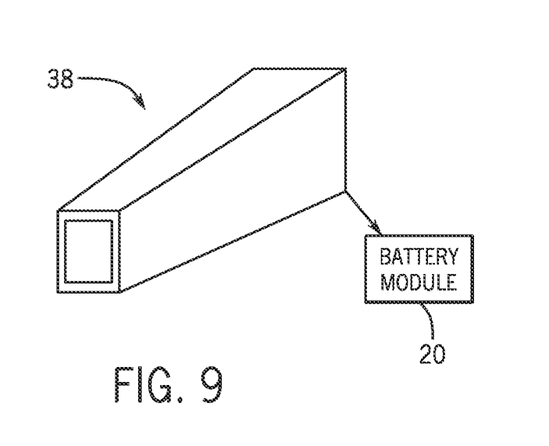
FIG. 9 is a schematic representation of an embodiment of a structural reinforcement component with a square base for use in the battery module of FIG. 3, in accordance with an aspect of the present disclosure.

FIG. 8 is a perspective view of an embodiment of the structural reinforcement component 38 for use in the battery module 20 of FIGS. 3-5, in accordance with an aspect of the present disclosure. In particular, the illustrated embodiment depicts the structural reinforcement component 38 with a frusto-conical shape 84 having the base 59, the apex 61, and the hollow region 80. It should be noted that the structural reinforcement component 38 may have other shapes, such as a polygon, a cone, a corrugated shape, or a tubular shape. The base 59 and the apex 61 in this particular embodiment of the column 84 are circular. However, as illustrated in FIG. 9, the base 59 and the apex 61 of the structural reinforcement component 38 (coupled to the battery module 20 of the present embodiments) may have any suitable geometric shape (e.g., square, oval, rectangular) and may be either hollow or solid. Further, the base 59 and the apex 61 may have different geometrical shapes, as may be desired for various types of load bearing situations.

Figure 10:
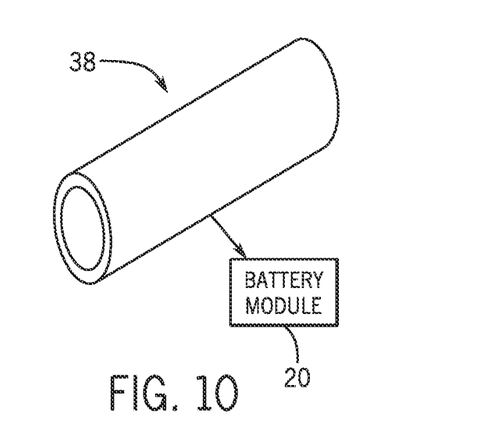
FIG. 10 is a schematic representation of a structural reinforcement component with a uniform cross sectional geometry for use in the battery module of FIG. 3, in accordance with an aspect of the present disclosure.

As shown in FIG. 8, in certain embodiments, the column 84 may include an angled edge 86 that tapers the hollow column 80 between the base 59 and the apex 61. In certain embodiments, the angled edge 86 may be at any non-90 degree angle with respect to the base 59. Specifically, the angled edge 86 may vary the cross sectional geometry of the structural reinforcement component 38 as the structural reinforcement component 38 extends from the internal partition 54 to the front cover 60. For example, a surface area of a first cross section 88 of the column 84 closer to the base 59 may be greater than a surface area of a second cross section 90 of the column 84 farther away from the base 59. In particular, the angled edge 86 and the overall conical shape of the column 84 may help to route and distribute the load evenly across a larger portion of the front cover 60, thereby enhancing the overall load bearing capacity of the battery module 20. In certain embodiments, the cross sectional area of the structural reinforcement component 38 may increase in a direction extending from the internal partition 54 to the front cover 60. In other embodiments, the cross section of the structural reinforcement component 38 may increase in a direction extending from the front cover 60 to the internal partition 54 or an hour glass shape may be used. Accordingly, the base 59 may be either larger or smaller than the apex 61. However, as illustrated in FIG. 10, the cross sectional geometry of the structural reinforcement component 38 (disposed within the battery module 20 of the present embodiments) may be uniform as it extends from the internal partition 54 to the front cover 60. In certain embodiments, the structural reinforcement component 38 may be formed of one or more individual columns that are arranged in one or more concentric circles.

The structural reinforcement component 38 may be formed of a variety of materials. For example, in certain embodiments, a variety of light but strong materials that do not interfere with electrical circuitry may be utilized. Further, in certain embodiments, the structural reinforcement component 38 may be formed of any material that may be used to manufacture the housing 30, or any material that may be easy to manipulate via injection molding or other suitable manufacturing processes. For example, the structural reinforcement component 38 may be formed of a polymeric material or other suitable material (e.g., an electrically insulative material). Further, in certain embodiments, the structural reinforcement component 38 may include an in-molded part (e.g., a metal column) to provide additional strength.

One or more of the disclosed embodiments, alone or in combination, may provide one or more technical effects useful in the manufacture of battery modules, and portions of battery modules. In general, embodiments of the present disclosure are directed to a battery module having the housing 30 and the structural reinforcement component 38 disposed within the housing 30. The structural reinforcement component 38 may be utilized to enhance the load bearing capacity of the battery module 20, in order to improve the crush and impact loading strength of the battery module 20. In particular, the structural reinforcement component 38 may include a hollow or a solid column that extends from the internal partition 54 of the battery module 20 to the front cover 60 of the battery module 20. The internal partition 54 may separate the electronics compartment 53 and the cell receptacle region 52 of the housing 30. The base 59 of the structural reinforcement component 38 may be integral with the internal partition 54. Further, the front cover 60 may include the receptacle region 63 and the raised ribs 85. The receptacle region 63 may abut the structural reinforcement component 38, such that they are not attached or otherwise coupled to one another. In certain embodiments, configuring the receptacle region 63 in this manner may allow for efficient and cost effect manufacturing processes. Further, the raised ribs 70 may distribute the load through the front cover 60, thereby helping to enhance the overall load bearing capacity of the battery module 20. The structural reinforcement component 38 may be any column shape or size, and may be disposed in any location within the electronics compartment 53.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
    a housing having a first cover and a second cover, wherein the housing comprises an electronics compartment, a cell receptacle, and an internal partition separating the electronics compartment from the cell receptacle;
    a plurality of lithium-ion (Li-ion) electrochemical cells disposed in the housing adjacent to the second cover, and
    a reinforcement column disposed within the housing and extending along a direction from the internal partition to the first cover, wherein an apex of the reinforcement column is positioned against the first cover and a base of the reinforcement column is directly coupled to the internal partition, wherein the reinforcement column is configured to enhance a load bearing capacity of the battery module.

2. The battery module of claim 1, wherein the plurality of Li-ion electrochemical cells are disposed within the cell receptacle.

3. The battery module of claim 1, wherein the base of the reinforcement column is integral with the internal partition.

4. The battery module of claim 1, wherein the internal partition comprises a plurality of raised ribs that receive a portion of the load from the reinforcement column and distribute the portion of the load through the internal partition.

5. The battery module of claim 1, wherein the first cover comprises a receptacle region configured to abut the apex of the reinforcement column, and wherein the apex and the base of the reinforcement column are positioned on opposite ends of the reinforcement column.

6. The battery module of claim 5, wherein the receptacle region of the first cover is arranged in a shape complementary to the apex of the reinforcement column.

7. The battery module of claim 5, wherein the receptacle region of the first cover comprises a plurality of attachment features configured to removably couple with the apex of the reinforcement column.

8. The battery module of claim 1, wherein the reinforcement column comprises a frusto-conical, a polygonal, a conical, a corrugated, or a tubular shape.

9. The battery module of claim 1, wherein the reinforcement column is hollow.

10. The battery module of claim 1, wherein the reinforcement column is disposed at a central region of an electronics compartment of the housing.

11. The battery module of claim 1, wherein the first cover comprises a plurality of raised ribs.

12. The battery module of claim 1, wherein a cross section of the reinforcement column varies along its longitudinal axis.

13. The battery module of claim 1, wherein a cross section of the reinforcement column is uniform along its longitudinal axis.

14. The battery module of claim 1, wherein the reinforcement column is made from the same materials as the housing.

* * * * *